(12) United States Patent
Nelson et al.

(10) Patent No.: US 6,631,686 B2
(45) Date of Patent: Oct. 14, 2003

(54) INSERT INJECTION MOLDED LAMINATE WORK SURFACE

(75) Inventors: Thomas J. Nelson, Belton, TX (US); Mark T. Krejchi, Temple, TX (US); Jon M. Patterson, Mokena, IL (US); Frank Villari, Oak Park, IL (US); Phil LoPresti, Chicago, IL (US); James P. Nelson, Naperville, IL (US); Mark D. Bauer, Mt. Prospect, IL (US); Peter Malcolm Green, North Yorkshire (GB)

(73) Assignee: Premark RWP Holdings Inc., Wilmington, DE (US)

( * ) Notice: Subject to any disclaimer, the term of this patent is extended or adjusted under 35 U.S.C. 154(b) by 17 days.

(21) Appl. No.: 09/810,332

(22) Filed: Mar. 19, 2001

(65) Prior Publication Data

US 2002/0129750 A1 Sep. 19, 2002

(51) Int. Cl.[7] ............................................. A47B 13/08
(52) U.S. Cl. ........................................ 108/90; 425/112
(58) Field of Search ........................... 264/267, 297.2, 264/328.1; 425/112, 113; 108/90

(56) References Cited

U.S. PATENT DOCUMENTS

| | | |
|---|---|---|
| 3,223,056 A | 12/1965 | Wilburn |
| 3,608,007 A | 9/1971 | Henrikson |
| 3,907,624 A | 9/1975 | Gravely, Jr. |
| 4,078,959 A | 3/1978 | Palfey et al. |
| 4,087,948 A | 5/1978 | Mellor |
| 4,160,761 A | 7/1979 | Prusinski et al. |
| 4,263,247 A | 4/1981 | Berger et al. |
| 4,315,967 A | 2/1982 | Prior et al. |
| 4,318,764 A | 3/1982 | VanManen |
| 4,397,798 A | 8/1983 | Parten |
| 4,622,191 A | 11/1986 | Takeuchi |
| 4,625,491 A | 12/1986 | Gibson |
| 4,626,185 A | 12/1986 | Monnet |
| 4,746,560 A | 5/1988 | Goeden |
| 4,832,995 A | 5/1989 | McLauchlin |
| 4,901,490 A | 2/1990 | Zinniel et al. |
| 4,905,437 A | 3/1990 | Heather |
| 4,916,016 A | 4/1990 | Bristowe et al. |
| 4,980,109 A | 12/1990 | Yamamoto et al. |
| 5,130,374 A | 7/1992 | Cozens et al. |
| 5,213,739 A | 5/1993 | Dickerson et al. |
| 5,319,522 A | 6/1994 | Mehta |
| 5,413,661 A | 5/1995 | Spengler et al. |
| 5,413,748 A | 5/1995 | Garza |
| 5,422,154 A | 6/1995 | Chen |
| 5,449,480 A | 9/1995 | Kuriya et al. |
| 5,682,724 A | 11/1997 | Randjelovic |
| 5,741,454 A | 4/1998 | Polidori |
| 5,876,651 A | 3/1999 | Blackburn, Jr. et al. |
| 5,904,886 A | 5/1999 | Stecker |
| 5,989,668 A | 11/1999 | Nelson et al. |
| 5,993,719 A | 11/1999 | Abe et al. |
| 6,025,064 A | 2/2000 | Kawata et al. |
| 6,045,738 A | 4/2000 | Atake |
| 6,045,744 A | 4/2000 | Kobayashi et al. |
| 6,117,384 A * | 9/2000 | Laurin et al. |
| 6,146,564 A | 11/2000 | Beckmann |
| 6,150,026 A | 11/2000 | Furuya et al. |
| 6,168,742 B1 | 1/2001 | Yamamoto |
| 6,174,482 B1 | 1/2001 | Reames et al. |
| 6,187,233 B1 | 2/2001 | Smith |
| 6,207,089 B1 | 3/2001 | Chuang |
| 6,428,738 B1 | 8/2002 | Winget et al. |

* cited by examiner

*Primary Examiner*—Jose V. Chen
(74) *Attorney, Agent, or Firm*—Welsh & Flaxman LLC

(57) ABSTRACT

An injection molded work surface for use in conjunction with a portable clothes washer includes a decorative laminate top surface and an underlying injection molded substrate. The substrate is provided with a connecting structure facilitating convenient attachment to the upper surface of the clothes washer.

10 Claims, 9 Drawing Sheets

INSERT INJECTION MOLDED LAMINATE WORK SURFACE

BACKGROUND OF THE INVENTION

1. Field of the Invention

The invention relates to the injection molding of decorative laminate panels. The invention further relates to a work surface for an appliance, for example, a portable clothes washer. More particularly, the invention relates to a method for insert injection molding a decorative laminate work surface for a portable clothes washer.

2. Description of the Prior Art

Decorative laminates provide consumers with a highly resilient surface adapted for a wide variety of uses. Decorative laminates may be used alone or they may be bonded to a substrate to form a decorative laminate panel. The cost and durability of decorative laminate panels make them a popular choice in the manufacture of structures ranging from countertops to furniture.

In the past, attempts have been made to provide a decorative laminate panel useful as a work surface for a portable clothes washer. The durability of decorative laminates makes them an ideal choice for converting the upper surface of a portable clothes washer to a work surface. In addition, the aesthetically desirable appearance of decorative laminates (they may be selected to coordinate with the clothes washer or room cabinets) is a vast improvement over other surfaces that might be chosen for use as the work surface of a portable clothes washer.

It has, however, been found that the heat and moisture generated by portable clothes washers including a decorative laminate work surface often result in uncontrolled warpage and/or delamination of the decorative laminate from the underlying substrate. As anyone can well appreciate, this is highly undesirable.

In addition to the warpage and delamination problems associated with the use of decorative laminate panels in conjunction with portable clothes washers, the manufacture of panels offering preferred functional components often requires extensive machining. For example, these work surfaces are often used within the room as if they were an extension of a regular countertop. It, therefore, is advantageous to provide a lip around the circumference of the panel for preventing objects from rolling off the work surface.

The attachment of a decorative laminate panel to a clothes washer also presents a problem with regard to the fabrication of the underlying substrate. These work surfaces are commonly secured to the upper surface of the clothes washer by positioning various connecting members between the clothes washer and the decorative laminate panel. As with the formation of a retaining lip, the fabrication of a decorative laminate panel shaped and dimensioned to engage selected connecting members requires that the substrate be machined to accommodate the desired connecting members.

Considering the necessary machining associated with the fabrication of a preferred work surface for a portable clothes washer, as well as the limited volume of work surfaces manufactured for each of a variety of portable clothes washers, the mass production (for example, using line processing common in the manufacture of other types of decorative laminate products) of decorative laminate work surfaces for portable clothes washers is economically impractical. As such, these decorative laminate work surfaces must be semi-custom manufactured to fit various clothes washers; once again adding expense to the final product.

With the foregoing in mind, those skilled in the art will understand that a need currently exists for both a decorative laminate panel adapted for use as a work surface of a portable clothes washer and a method for manufacturing such a decorative laminate work surface. The present invention provides the desired decorative laminate work surface and a method for manufacturing the decorative laminate work surface.

SUMMARY OF THE INVENTION

It is, therefore, an object of the present invention to provide an appliance work surface shaped and dimensioned for placement upon the upper surface of an appliance. The work surface includes a decorative laminate and an injection molded substrate bonded to the underside of the decorative laminate.

It is also an object of the present invention to provide an appliance including a work surface secured to the upper surface thereof. The appliance includes an appliance body having an upper surface and a work surface coupled to the upper surface thereof. The work surface includes a decorative laminate and an injection molded substrate bonded to the underside of the decorative laminate.

It is a further object of the present invention to provide an appliance including a coupling assembly securing a work surface to the upper surface thereof. The coupling assembly includes a track member secured to the upper surface of the appliance body. The track member includes first and second upwardly extending flanges defining a channel. The coupling assembly further includes a connecting member shaped and dimensioned for secure attachment within the channel defined by the upwardly extending flanges. The connecting member includes first and second expansion members which move outwardly as the connecting member is forced downwardly within the channel to securely couple the connecting member within the track member and to force the first and second upwardly extending flanges outwardly into engagement with an underside of the work surface such that the work surface is securely coupled to the track member.

It is another object of the present invention to provide a method for fabricating a decorative laminate work surface adapted for attachment to the upper surface of an appliance, wherein the decorative laminate work surface includes a decorative laminate layer and a substrate. The method is achieved by forming a decorative laminate of a predetermined size, placing the decorative laminate within a die cavity, injection molding the substrate within the die cavity while the decorative laminate remains within the die cavity to form a decorative laminate work surface and releasing the formed decorative laminate work surface from the die cavity.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
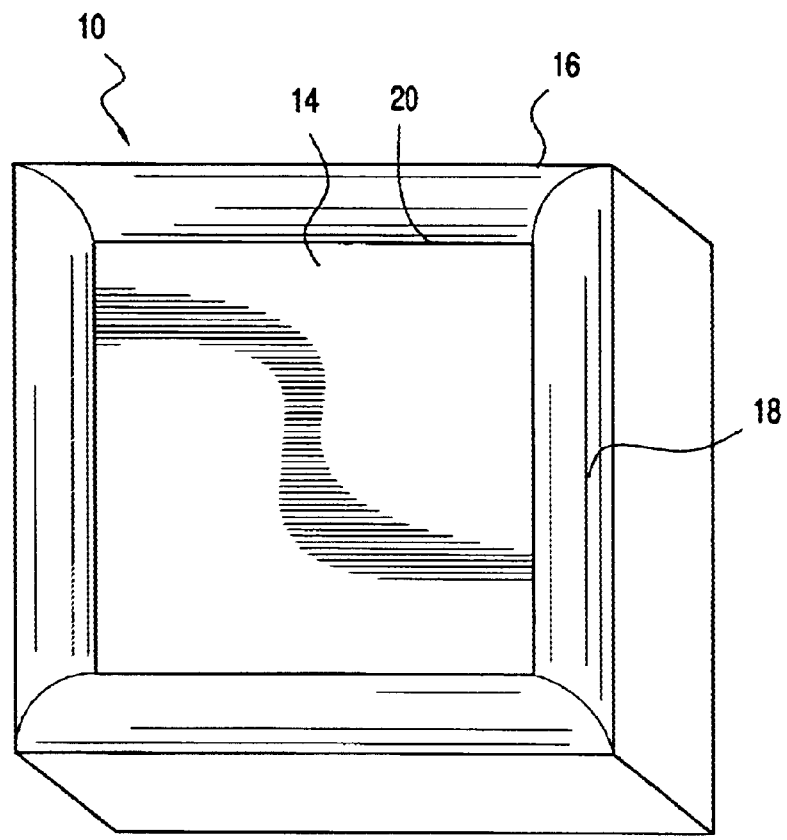
FIG. 1 is a perspective view of a work surface in accordance with the present invention.
Figure 2:
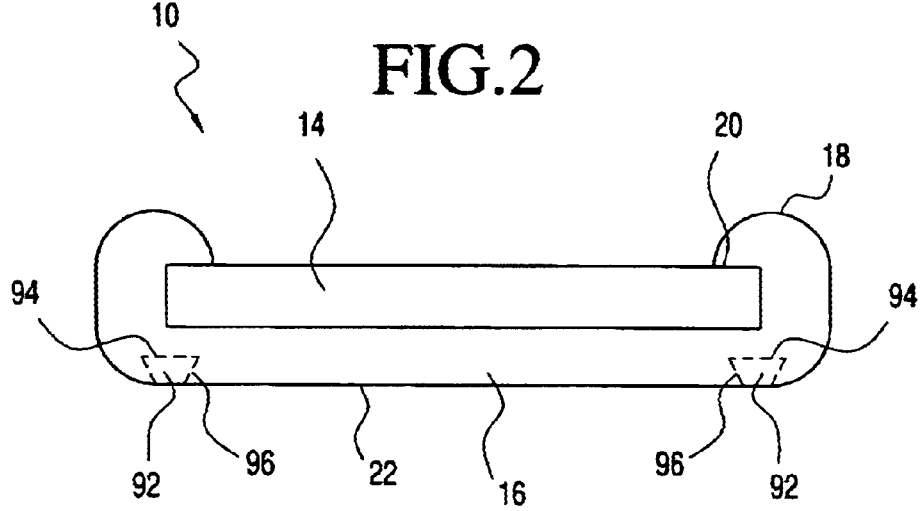
FIG. 2 is a cross sectional view of the work surface shown in FIG. 1.
Figure 3:
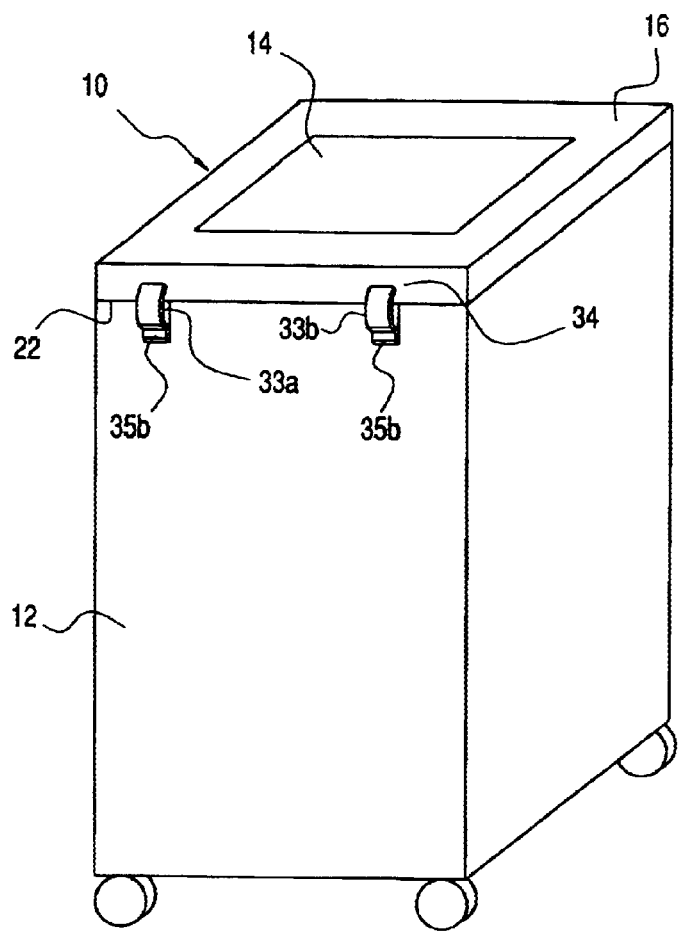
FIG. 3 is a rear perspective view of a clothes washer with the work surface shown in FIGS. 1 and 2 secured thereto.

With reference to FIGS. 1, 2 and 3, a decorative laminate work surface 10 for use in conjunction with a portable clothes washer 12 is disclosed. The work surface 10 is disclosed for use with a clothes washer 12 in accordance with a preferred embodiment of the present invention, although those skilled in the art will appreciate that the present work surface may be used in conjunction with a variety of appliances without departing from the spirit of the present invention.

The decorative laminate work surface 10 includes a decorative laminate 14 and an insert injection molded substrate 16. While a decorative laminate is disclosed for use in accordance with a preferred embodiment of the present invention, it is contemplated other surfacing materials may be used without departing from the spirit of the present invention. For example, it is contemplated that the decorative laminate may be replaced with traditional solid surfacing material, solid surfacing laminate, or solid surfacing veneer.

The decorative laminate 14 is a conventional decorative laminate and generally includes plural layers of synthetic resin impregnated paper sheets bonded under heat and pressure to form a unitary structure. In accordance with a preferred embodiment of the present invention, the decorative laminate 14, from the bottom up, includes a core of one or more phenolic resin impregnated sheets, above which lies a decorative melamine impregnated sheet. The decorative sheet is then further covered with a melamine impregnated overlay.

The core may, for example, include a plurality of sheets of 120–323 g/m² dry phenolic resin impregnated kraft paper. The kraft paper is impregnated throughout and bonded with a substantially completely cured phenolic resin which has been converted to a thermoset state during the initial laminating step.

The decorative sheet provides the decorative laminate 14 with an attractive appearance. The decorative sheet is preferably manufactured from high quality 80–202 g/m² ream weight, pigment filled, alpha cellulose paper impregnated with a water alcohol solution of melamine-formaldehyde resin. The overlay sheet is preferably a melamine impregnated paper layer and dictates the surface characteristics of the decorative laminate 14. For example, the composition of the overlay sheet dictates the decorative laminate's resistance to chemical agents, heat, light, shock and abrasion.

The resin impregnated paper is subsequently dried, partially cured, and finally cut into sheets. The pigment filled, alpha cellulose paper of the decorative sheet, may include a solid color, a decorative design, or a photo-gravure reproduction of natural materials, such as, wood, marble, leather, etc. The aesthetic characteristics of the cellulose paper are revealed as the laminate's decorative design upon completion of the decorative laminate 14.

In accordance with traditional techniques, the decorative laminate 14 is manufactured by placing the resin impregnated core, decorative sheet and overlay sheet between steel plates and subjecting the laminate stack to temperatures in the range of about 121–149° C. at about 56.24–112.49 kgf/cm² for a time sufficient to consolidate the laminate and cure the resins (generally about 25 minutes to an hour). The pressure and heat force the resin in the paper sheets to flow, cure and consolidate the sheets into a unitary laminated mass referred to in the art as a decorative high pressure laminate.

Generally, more than one laminate is formed at one time. Multiple laminates are formed by inserting a plurality of assembled sheets in a stack. Release sheets are positioned between the assembled sheets to separate the various laminates stacked together. After consolidation, the release sheets permit ready separation of the individual laminates.

As will be discussed below in greater detail, the substrate 16 is injection molded about and below the decorative laminate 14. The substrate 16 is formed with a lip 18 surrounding the outer edge 20 of the decorative laminate 14 and an underside 22 shaped and dimensioned for secure attachment to an underlying clothes washer 12. In accordance with a preferred embodiment of the present invention, the substrate 16 may be composed of filled plastics, unfilled plastics, ceramics, fibers, polymeric foams, and combinations thereof. Fillers, such as, wollastonite, glass fiber, calcium carbonate, mica, ath, etc., may be used in conjunction with these materials. More particularly, the substrate 16 may be composed of thermoplastic materials, including, but not limited to, traditional solid surfacing materials, vinyls, polyolefins, styrenics, polyamides, polyimides, polyethers, polyesters, acrylics, acetals, thermoplastic olefins, thermoplastic urethanes, and thermoplastic elastomers. It is also envisioned that the substrate 16 may be formed from thermoset materials where reaction injection molding is applied. Under these conditions, thermoset materials, such as, epoxies, polyurethanes, phenolics, melamines, etc, may be used. It is further contemplated that the substrate 16 may be a foamed thermoplastic.

More specifically, the substrate 16 is preferably formed from acrylic-butadiene-styrene (ABS), although other materials may be used without departing from the spirit of the present invention.

Figure 4:
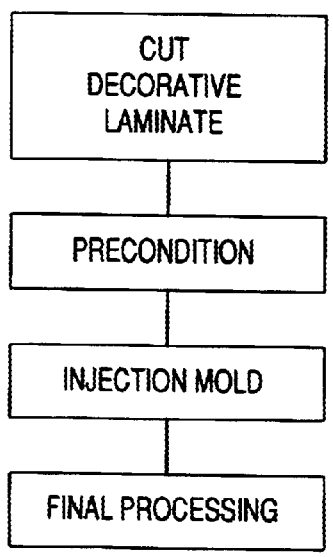
FIG. 4 is a flow chart of the injection molding process in accordance with the present invention.

With reference to FIG. 4, a flow chart of the present method for the manufacture of a decorative laminate work surface 10 is disclosed. For the purposes of fully disclosing the present invention, this detailed description outlines the fabrication of a decorative laminate work surface 10 for a portable clothes washer 12, although those skilled in the art will readily appreciate the wide variety of possible applications for the present decorative laminate panel fabrication process.

Briefly, the present method provides for the insert injection molding of a decorative laminate work surface 10 of a portable clothes washer 12. This eliminates the problems discussed above in the "Background of the Invention".

The decorative laminate 14 is first cut or die stamped into appropriate sizes for use in conjunction with the injection molding cavities 24 employed in accordance with the present process. The decorative laminate sheet is generally cut into 48.90 cm by 55.88 cm squares, as this is the most commonly used shape in the fabrication and installation of portable clothes washer work surfaces 10. While a preferred shape and dimension are disclosed above, the decorative laminate may be cut into a variety of shapes without departing from the spirit of the present invention.

In addition, it is contemplated that various laminate sizing techniques known to those skilled in the art may be employed in accordance with the present invention. In fact, the cutting of the decorative laminate 14 need not take place immediately before the injection molding step. The decorative laminate 14 may be cut-to-size and stored under appropriate conditions for later use. However, it is contemplated that the cutting step and the injection molding step will take place as part of a continuous process with the decorative laminate 14 being cut just prior to the preconditioning of the decorative laminate 14 and formation of the complete decorative laminate work surface 10. A continuous system such as disclosed is believed to be more cost effective since the necessity for storing precut laminate sheets would add additional expense to the process.

Figure 5:
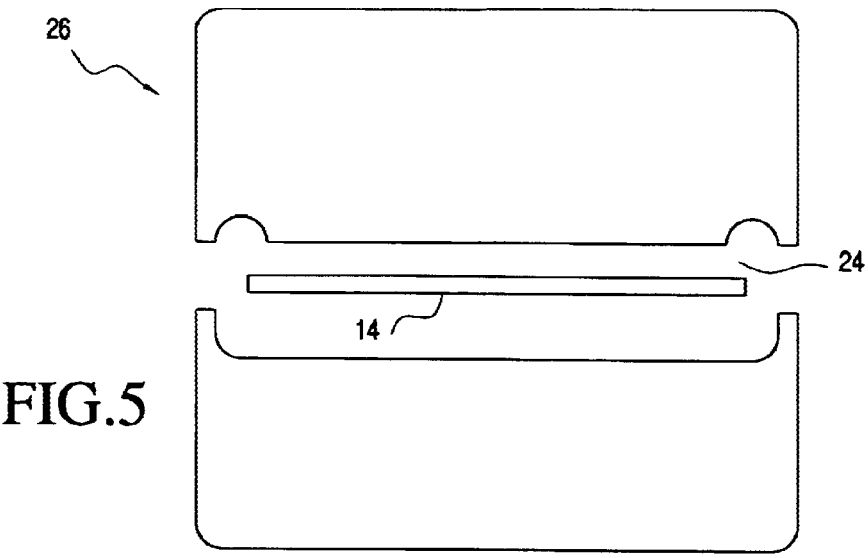
FIG. 5 is a cross sectional view of an open die receiving a decorative laminate in accordance with the present invention.

Once formed, the cut decorative laminate 14 is preconditioned by drying the decorative laminate 14. In accordance with a preferred embodiment of the present invention, the decorative laminate is dried at 66° C. to 93° C. for a period of approximately 10 to 20 minutes. Once the decorative laminate 14 is preconditioned, it is conveyed to a die cavity 24 (see FIG. 5). The step of preconditioning allows the cut decorative laminate 14 to be physically prepared in order to optimize the bond created between the substrate 16 and the decorative laminate 14.

Figure 6:
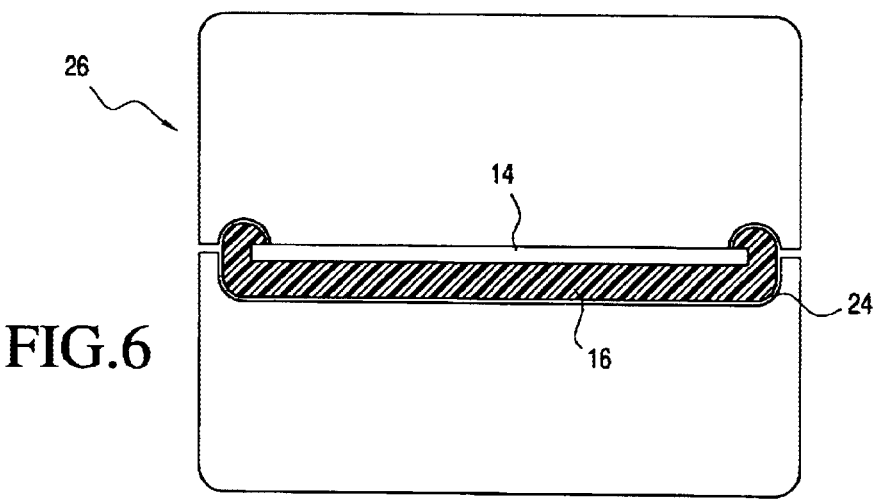
FIG. 6 is a cross sectional view of a closed die in which substrate material has been injected.

Briefly, and as will be discussed below in greater detail, when the decorative laminate 14 is placed within the die cavity 24, the die 26 is closed and substrate material is injected within the die cavity 24 to create the substrate 16 of the work surface 10 (see FIG. 6). The substrate material is chosen to ensure the formation of a secure bond between the formed substrate 16 and the decorative laminate 14 as the molten substrate material is shot within the die cavity 24.

Figure 7:
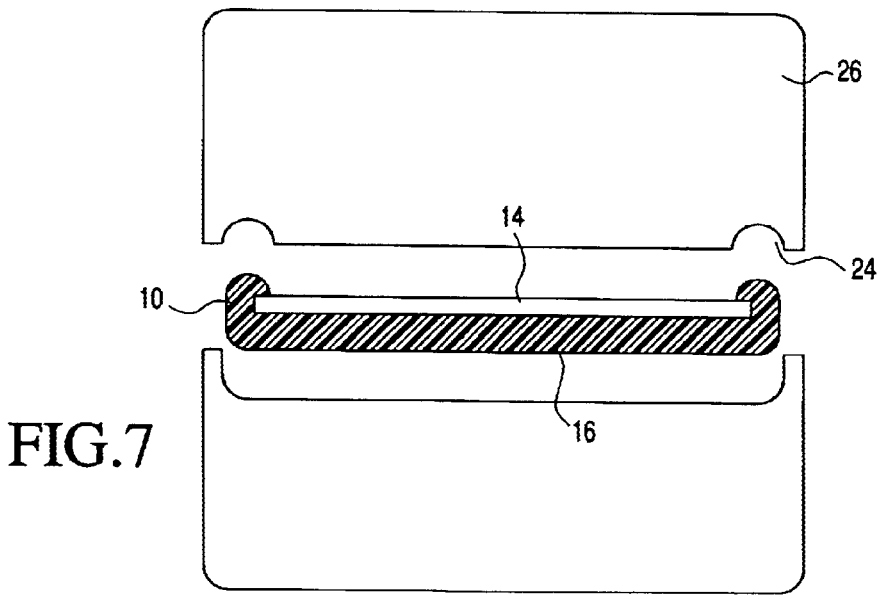
FIG. 7 is a cross sectional view of an open die releasing a formed work surface in accordance with the present invention.
Figure 8:
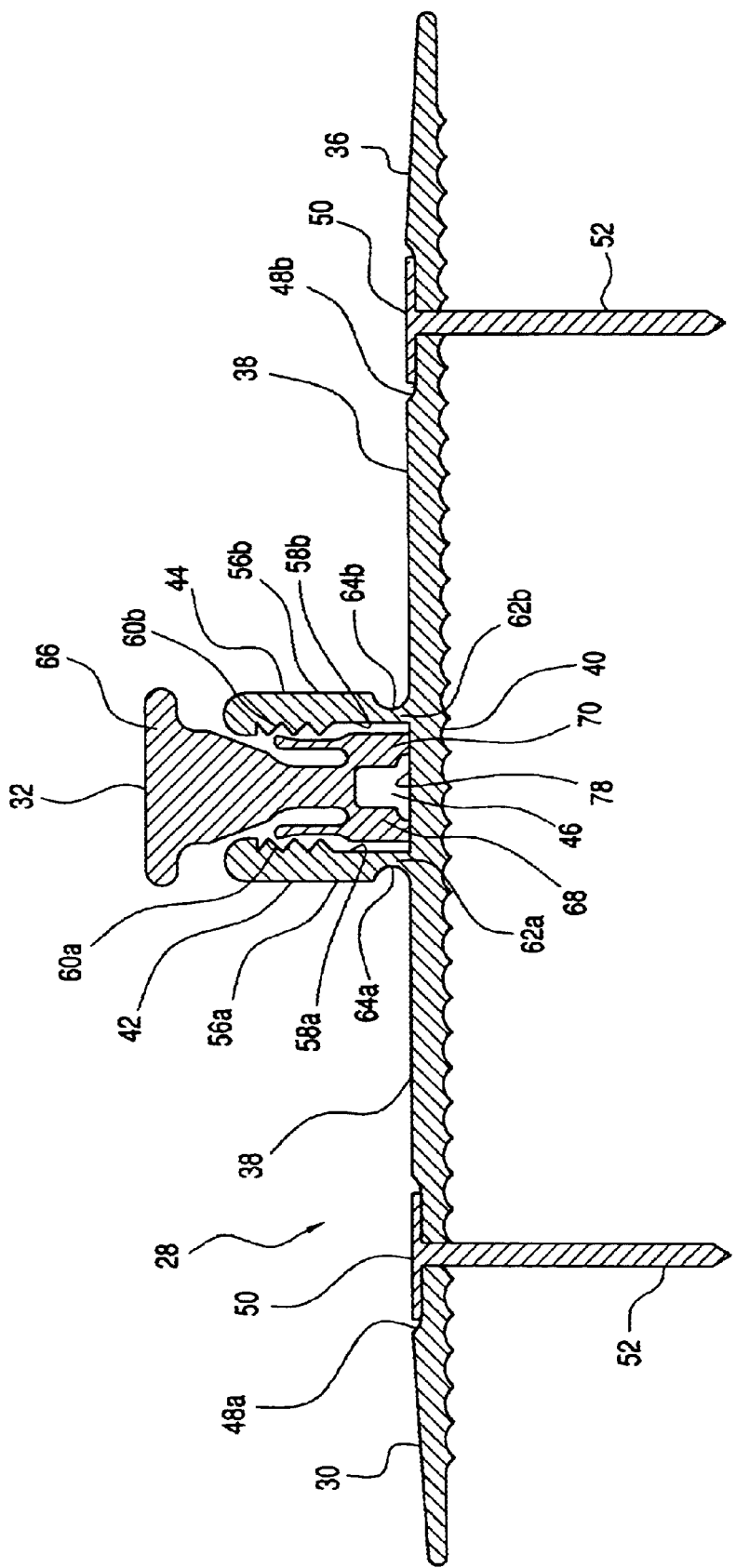
FIG. 8 is a cross sectional view of the coupling assembly used in accordance with the present invention.
Figure 9:
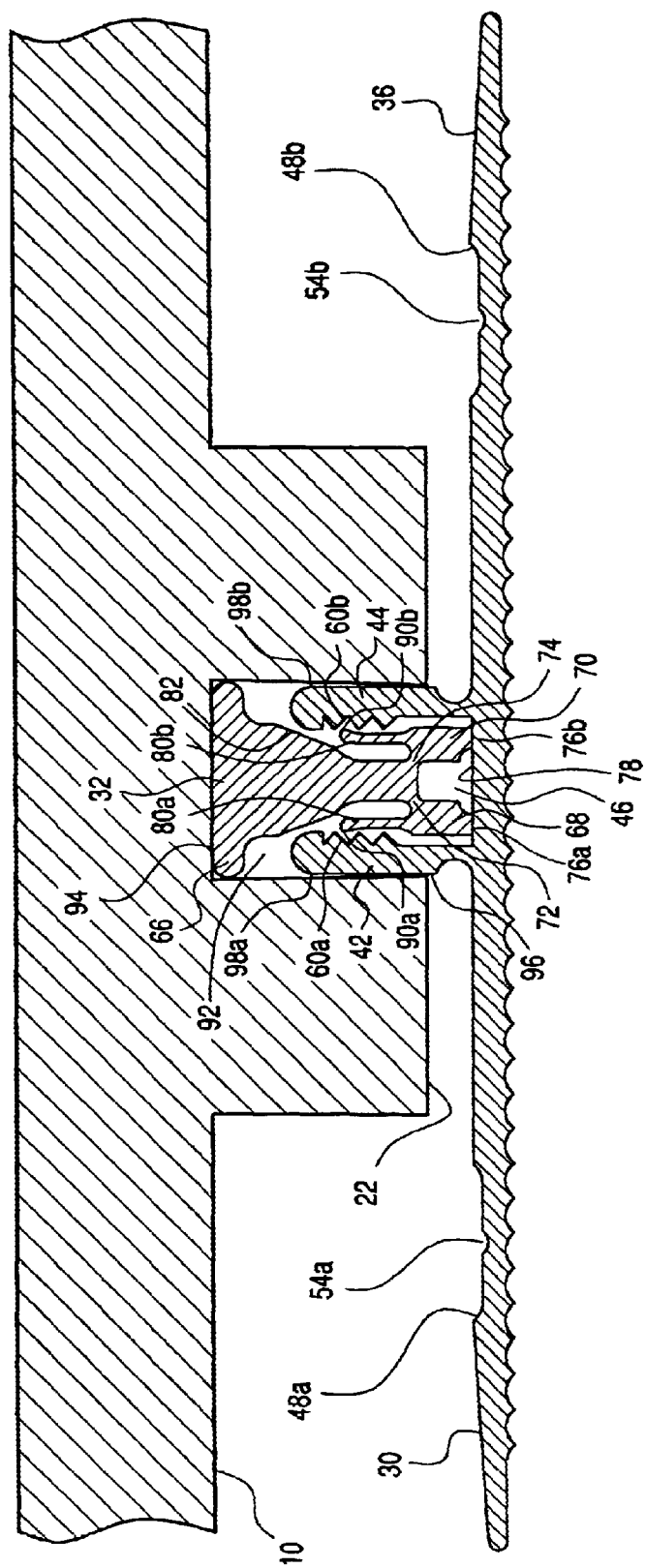
FIGS. 9, 10 and 11 are cross sectional views showing the steps associated with the installation of a work surface in accordance with the present invention.
Figure 10:
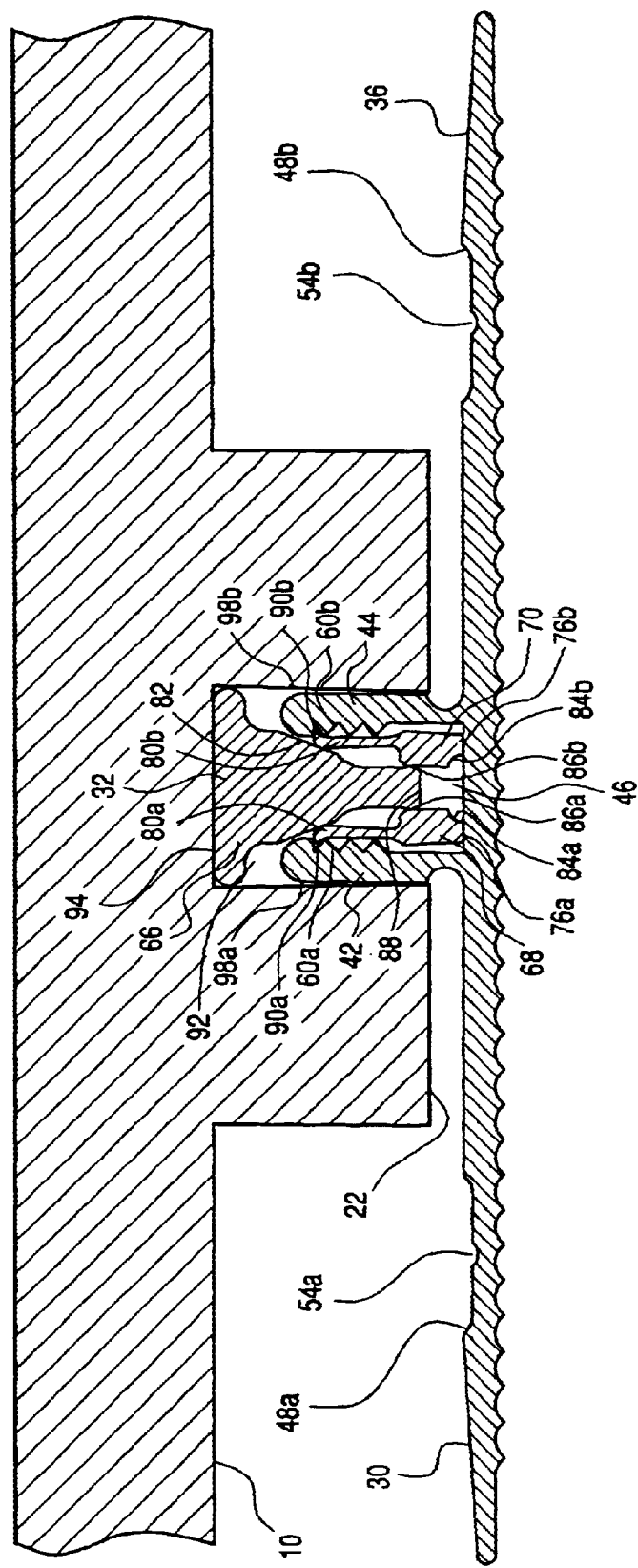
Figure 11:
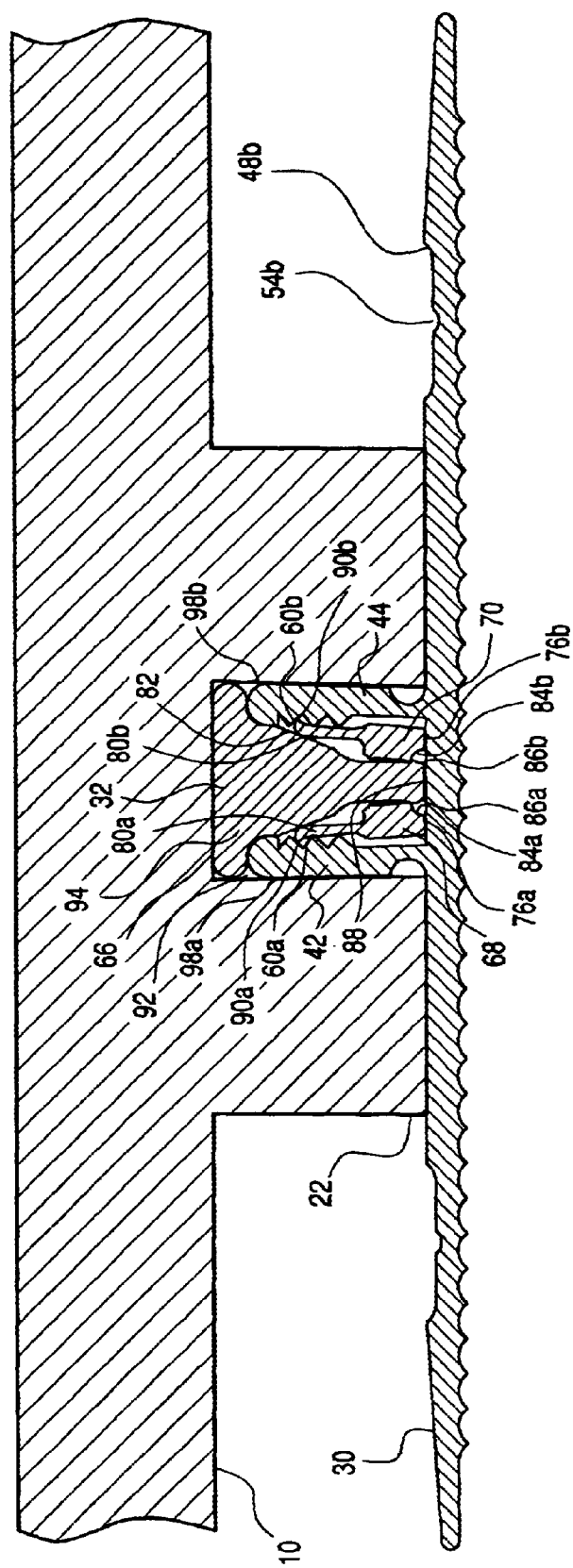
Figure 13:
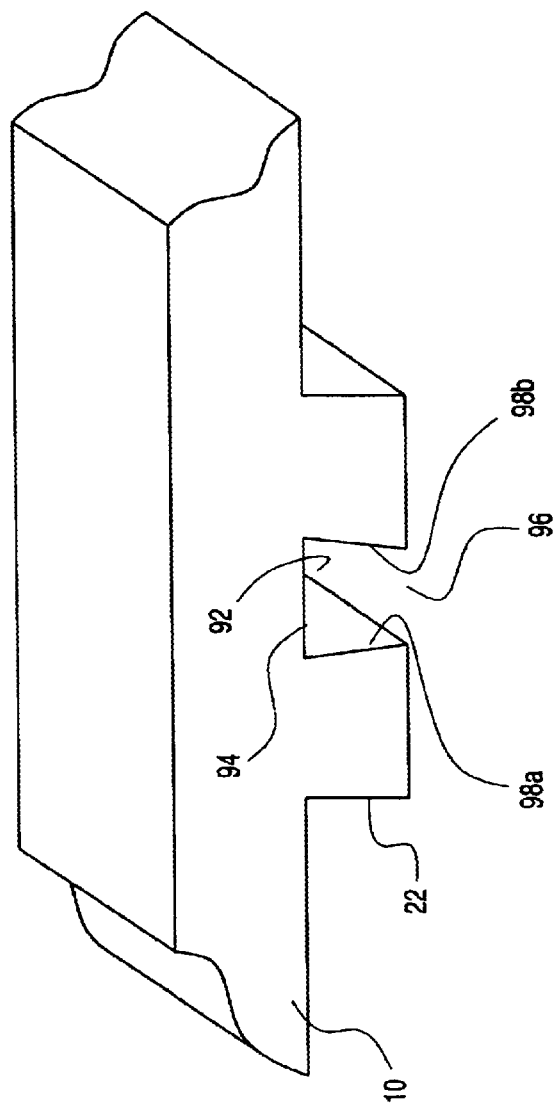
FIG. 13 is a perspective view of the work surface showing a connecting recess.
Figure 12:
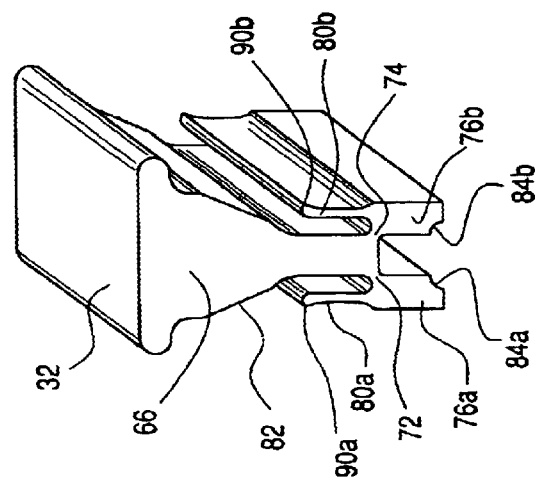
FIG. 12 is a perspective view of the connecting member.
Figure 14:
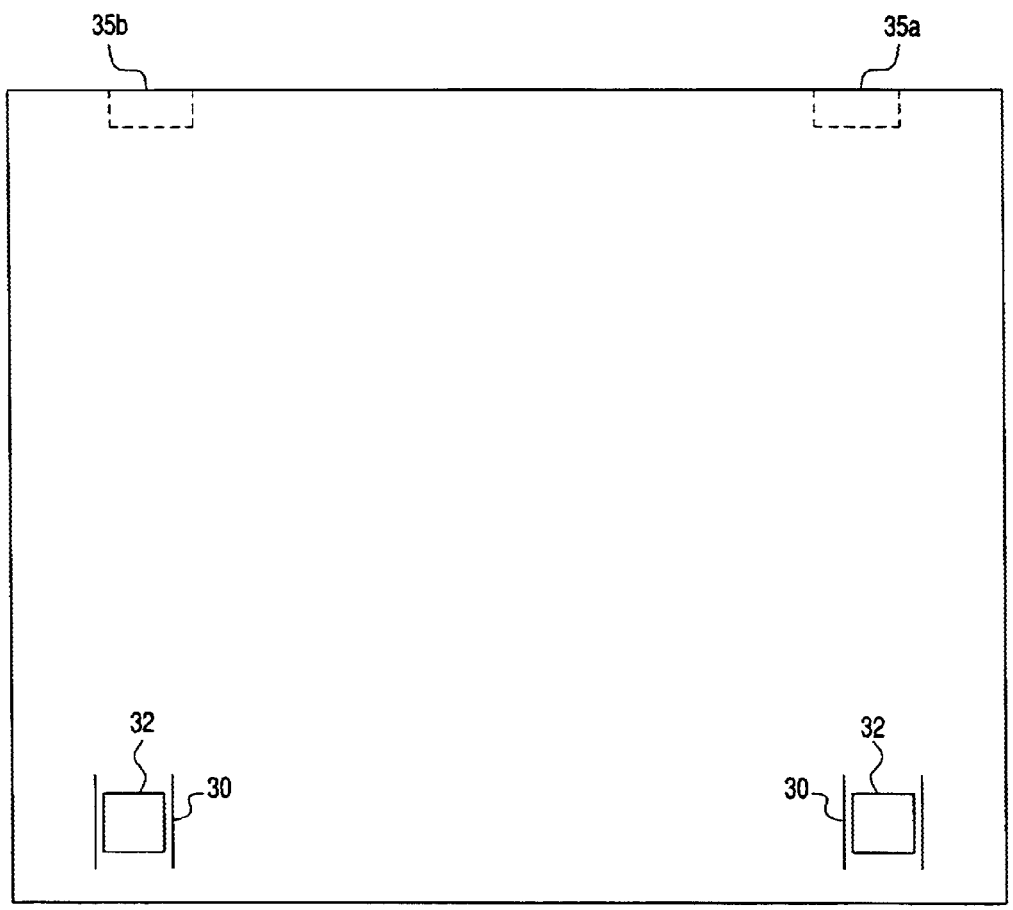
FIG. 14 is a top view of the track member and connecting members secured to the upper surface of the clothes washer.

After the injection of the substrate material, the cavity 24 remains closed for a period of time sufficient to allow the work surface 10 to set. Finally, the cavity 24 is opened, the resulting molded work surface 10 is released from the mold cavity 24 and the work surface 10 is conveyed for post processing, packaging and transport (see FIG. 7). Specifically, the formed work surface 10 is post processed to correct any imperfections resulting from the injection molding process. For example, post processing may include the removal of irregularities, that is, flash, resulting from the injection molding processing.

Where work surfaces are formed in accordance with the present invention, the substrate 16 thereof may be formed with structural ribbing designed to add structural stability to the final panel. In addition, by insert injection molding the decorative laminate work surface 10 in accordance with the present invention, many shortcomings of prior art laminate fabrication techniques are overcome. For example, limited tooling is required for injection molding the decorative laminate work surface 10. In addition, all machining equipment used in prior art decorative laminate fabrication techniques may be replaced by a cutting assembly for the decorative laminate 14, a preliminary conditioning station for the decorative laminate 14, an injection molding die 26 and final processing station; providing a substantial savings in both space and tooling.

The result of such a process is a reduction in the tooling required for the processing of decorative laminate work surfaces 10 and a limited number of stations which might break down. In fact, if the decorative laminate 14 is cut apart from the injection molding step, only the preconditioning step precedes the injection molding of the decorative laminate work surface 10.

The present insert injection molding process also permits the creation of unique profiles, which would be otherwise cost prohibitive, or even impossible, using conventional fabrication techniques employed in the processing of decorative laminate panels. When insert injection molding techniques are employed, the profiles which may be created are only limited by the creativity of those designing the decorative laminate work surface.

As mentioned above, the substrate 16 is formed with connecting members on its underside 22. The underside 22 of the work surface 10 is formed for coupling as shown in FIGS. 2 and 8–14. Specifically, the present coupling assembly 28 securely couples the work surface 10 to the portable clothes washer 12. The coupling assembly 28 includes a pair of track members 30 secured to the clothes washer 12 and a pair of connecting members 32. Each of the connecting members 32 is shaped and dimensioned for secure attachment within a track member 30 for attaching the work surface 10 to the track member 30 and clothes washer 12. The work surface 10 is further provided with first and second downwardly extending bracket members 33a, 33b which attach to recesses 35a, 35b in the back of the cloth washer 12 and function with the coupling assembly 28 to maintain the work surface 10 securely attached to the clothes washer 12 (see FIG. 3).

The track members 30 are preferably formed from extruded aluminum, although other materials may be used without departing from the spirit of the present invention. The connecting members 32 are injection molded and formed from high density polyethylene, although other materials and manufacturing techniques may be employed without departing from the spirit of the present invention.

The track members 30 are elongated members formed into a desired length for attachment to the upper surface 34 of the clothes washer 12. With this in mind, the track members 30 may be integrally formed with the upper surface 34 of the clothes washer 12 or manufactured as separate components and subsequently attached thereto. The track members 30 will be described below as separately formed structures, although those skilled in the art will readily appreciate the steps needed to form the track members integrally with the clothes washer 12. Each track member 30 includes a base 36 with a work surface 38 and a bottom surface 40. The work surface 38 includes first and second upwardly extending flanges 42, 44 defining a channel 46.

The work surface 38 further includes longitudinally extending recesses 48a, 48b on opposite sides of the first and second flanges 42, 44. The recesses 48a, 48b provide space allowing the heads 50 of the securing bolts 52 to lie substantially flush with the work surface 38 of the track member 30. A longitudinal groove 54a, 54b is formed within the center of each recess 48a, 48b. The groove 54a, 54b is designed to guide the tip of a bolt 52 as it is fastened to the track member 30.

The first and second upwardly extending flanges 42, 44 are substantially mirror images of each other. Each flange includes an exterior surface 56a, 56b and an interior surface 58a, 58b. The exterior surface 56a, 56b is substantially smooth, although it may include texturing, serrations or other variations, without departing from the spirit of the present invention. For reasons that will be better appreciated based upon the following disclosure, the smooth exterior surface 56a, 56b prevents movement of the work surface 10 relative to the track member 30 from wearing away and loosening the work surface 10.

The interior surface 58a, 58b of each flange 42, 44 is provided with inwardly directed ribs 60a, 60b shaped and dimensioned to engage the connecting member 32 in a manner that will be discussed below in greater detail. In addition, the base 62a, 62b of each flange 42, 44 includes a weakened section allowing the flange 42, 44 to flex outwardly for reasons discussed in greater detail below. Specifically, the exterior surface 56a, 56b of each flange 42, 44 includes a recessed section 64a, 64b adjacent the base 62a, 62b of the flange 42, 44. The recessed section 64a, 64b provides additional flexibility at the base 62a, 62b of the flange 42, 44, permitting the flange 42, 44 to flex outwardly for the retention of the work surface 10 thereon.

Each connecting member 32 is shaped and dimensioned for secure attachment within the channel 46. Each connecting member 32 is approximately 1.905 cm long, although this length may be varied without departing from the spirit of the present invention. As will be discussed in greater detail below, the connecting members 32 are positioned into respective track members 30 during the installation process (See FIG. 14).

In use, the connecting member 32 expands outwardly as it is forced downwardly within the channel 46. The connecting member 32 includes a central spike 66 with a first expansion member 68 extending from one side of the central spike 66 and a second expansion member 70 extending from an opposite side of the central spike 66. First and second frangible joints 72, 74 couple the first and second expansion members 68, 70 to the central spike 66.

Briefly, and as discussed in greater detail below, the first and second expansion members 68, 70 are releasably coupled to the central spike 66 such that the first expansion member 68 and the second expansion member 70 move outwardly as the central spike 66 is forced downwardly within the channel 46. As the first and second expansion members 68, 70 are forced outwardly, they act upon the first and second upwardly extending flanges 42, 44 to force the upwardly extending flanges 42, 44 outwardly into engagement with the work surface 10 such that the work surface 10 is securely coupled to the track member 30.

With this in mind, each expansion member 68, 70 includes a lower end 76a, 76b shaped and dimensioned for engagement with the floor 78 of the channel 46 as the central spike 66 is pushed downwardly within the channel 46. Each expansion member 68, 70 includes an upper end 80a, 80b shaped and dimensioned for receipt within the ribs 60a, 60b formed along the interior surface 58a, 58b of each upwardly extending flange 42, 44.

Collapse of the connecting member 32 within the channel 46 will now be described in detail. After the connecting member 32 is loosely inserted within the channel 46, the lower ends 76a, 76b of the first and second expansion members 68, 70 contact the floor 78 of the channel 46. Downward pressure is then applied to the central spike 66, for example, by a work surface 10 placed over the track member 30 and the connecting member 32.

As downward pressure is applied to the central spike 66, the first and second frangible joints 72, 74 break. That is, the first and second expansion members 68, 70 are broken from the central spike 66. The central spike 66 is then free to move downwardly within the channel 46, and between the first and second expansion members 68, 70.

As the central spike 66 moves downwardly between the first and second expansion members 68, 70, the outwardly tapering shaft 82 of the central spike 66 is brought into contact with the upper ends 80a, 80b of the first and second expansion members 68, 70, forcing the first and second expansion members 68, 70 to move outwardly and apply pressure to the upwardly extending flanges 42, 44. This pressure causes each flange 42, 44 to bow outwardly approximately 2½° in the presently described embodiment.

The unique shape of the connecting member 32 securely binds the connecting member 32 within the channel 46 as it applies pressure to the upwardly extending flanges 42, 44. Specifically, the lower end 76a, 76b of each expansion member 68, 70 includes interior recesses 84a, 84b shaped to respectively receive the remnant projections 86a, 86b remaining along the lower end 88 of the central spike 66 after it has split from the expansion members 68, 70. In this way, the central spike 66 is prevented from moving up once the connecting member 32 is fully seated within the channel 46.

In addition, the upper ends 80a, 80b of the expansion members 68, 70 are provided with dogs 90a, 90b which seat within the ribs 60a, 60b formed along the interior surfaces 58a, 58b of the first and second upwardly extending flanges 42, 44. As with the lower end 88 of the central spike 66 seating within recesses 84a, 84b formed along the lower ends 76a, 76b of the expansion members 68, 70, the dogs 90a, 90b prevent the connecting member 32 from moving up once it is fully seated within the channel 46.

The outward flexing provided by the coupling assembly 28 is used to securely couple the work surface 10 to the clothes washer 12 with a dovetail joint. For example, and with reference to FIGS. 3 and 8–14, once the track members 30 are properly secured to the upper surface 34 of the clothes washer 12, appropriate connecting members 32 are inserted, and spaced, within the channel 46 (for example, one connecting member in each channel). The bracket members 33a, 33b are hooked to the back of the clothes washer 12 and the work surface 10 is rotated downwardly bringing the underside 22 of the work surface 10 into contact with the track members 30 and the connecting members 32.

In accordance with the preferred embodiment of the present invention, the underside 22 of the work surface 10 is formed with a pair of recesses 92 positioned to align with the track members 30 when the work surface 10 is properly secured to the clothes washer 12. Each of the recesses 92 is slightly larger than the exterior spacing between the upwardly extending flanges 42, 44 of the track member 30; that is, a female dovetail joint member. The recesses are, however, formed such that the base 94 of each recess 92 is slightly wider than the open end 96 of the recess 92. That is, the walls 98a, 98b of the recess 92 taper in slightly, for example, by approximately 2½° each, as they extend from the base 94 of the recess 92 to the open end 96 of the recess 92.

Once the work surface 10 is in contact with the track members 30 and connecting members 32, it is pressed downwardly and pressure is applied to the central spike 66 breaking the first and second frangible joints 72, 74. That is, the first and second expansion members 68, 70 are broken from the central spike 66. The central spike 66 is then free to move downwardly within the channel 46, and between the first and second expansion members 68, 70.

As the central spike 66 moves downwardly between the first and second expansion members 68, 70, the outwardly tapering shaft 82 of the central spike 66 is brought into contact with the upper ends 80a, 80b of the first and second expansion members 68, 70, causing the first and second expansion member 68, 70 to expand outwardly and apply pressure to the upwardly extending flanges 42, 44. This pressure causes each flange 42, 44 to bow outwardly approximately 2½°.

It should be appreciated that the tapered shaft 82 should not begin forcing the upper ends 80a, 80b of the expansion members 68, 70 outwardly until the open end 96 of the work surface 10 is at least approximately half way down the flanges 42, 44. In this way, outward bowing of the flanges 42, 44 does not impede the movement of the work surface 10 over the track member 30. If the flanges 42, 44 were to begin bowing outwardly too early, the underside 22 of the work surface 10 adjacent the recess 92 will contact the upper end of the flanges 42, 44 and damage the work surface 10, the flanges 42, 44, or both.

The bowed flanges 42, 44 engage the walls 98a, 98b of the recess 92 formed in the underside 22 of the work surface 10 to form a dovetail joint securely binding the work surface 10 to the track member 30, and the underlying clothes washer 12. That is, the combination of the outwardly bowed flanges 42, 44 and the tapered recess 92 form a dovetail joint which very securely binds the work surface 10 to the clothes washer 12.

The combination of the connecting members 32 bowing the flanges 42, 44 outwardly and the recess 92 (that is, female dovetail joint member) of the work surface 10 forms a dovetail joint without the need for 90° insertion of adjacent members of a dovetail joint assembly. In this way, the present coupling assembly 28 provides a substantially permanent attachment mechanism for joining adjacent articles. In fact, once the work surface 10 is properly secured to the track members 30, the connecting members 32 must be physically damaged to facilitate removal from the track members 30.

As discussed above, the unique shape of the connecting member 32 securely binds the connecting member 32 within the channel 46 as it applies pressure to the upwardly extending flanges 42, 44. In fact, the dogs 90a, 90b along the upper ends 80a, 80b of the first and second expansion members 68, 70 are designed to sequentially engage the ribs 60a, 60b formed along the interior surface 58a, 58b of the flanges 42, 44 as the work surface 10 and connecting member 32 settle downwardly in relation to the track member 30. Specifically, as the connecting member 32, and the work surface 10, move downwardly during settling, the dogs 90a, 90b move down and engage the next lower set of ribs to securely bind the connecting member 32 in position.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A method for fabricating a decorative laminate work surface adapted for attachment to the upper surface of an appliance, wherein the decorative laminate work surface includes a decorative laminate layer and a substrate, the method comprising the following steps:

forming a decorative laminate of a predetermined size, the decorative laminate including an outer edge;

placing the decorative laminate within a mold cavity;

injection molding the substrate within the mold cavity while the decorative laminate remains within the mold cavity to form a decorative laminate work surface, the step of injection molding including forming a lip surrounding the outer edge of the decorative laminate to define a rim about the decorative laminate and creating at least one downwardly facing connecting member within the resulting substrate for facilitating coupling to the upper surface of the appliance; and releasing the formed decorative laminate work surface from the mold cavity.

2. The method according to claim 1, wherein the substrate is composed of a material chosen from the group consisting of filled plastics, unfilled plastics, ceramics, fibers, polymeric foams, and combinations thereof.

3. The method according to claim 2, wherein the substrate is composed of acrylic-butadiene-styrene.

4. The method according to claim 1, wherein the step of forming includes cutting a decorative laminate sheet to a predetermined size to form a cut decorative laminate.

5. The method according to claim 1, further including the step of preconditioning the decorative laminate before placing the decorative laminate within the die cavity.

6. The method according to claim 1, further including the step of drying the decorative laminate prior to the step of placing the decorative laminate with the die cavity.

7. The method according to claim 1, wherein the substrate includes an underside and the connecting member is formed in th underside of the substrate.

8. The method according to claim 7, wherein the connecting member is a recess formed in the underside of the substrate.

9. The method according to claim 8, wherein the recess includes a base and an open end, and the base is slightly wider than the open end.

10. The method according to claim 1, wherein the step of injection molding further includes creating at least one bracket recess in the substrate, the bracket recess being shaped and dimensioned for attachment to respective bracket members.

* * * * *